United States Patent
Uwano

(10) Patent No.: US 11,093,463 B2
(45) Date of Patent: Aug. 17, 2021

(54) MISSING VALUE IMPUTATION DEVICE, MISSING VALUE IMPUTATION METHOD, AND MISSING VALUE IMPUTATION PROGRAM

(71) Applicant: FANUC CORPORATION, Yamanashi (JP)

(72) Inventor: Tomofumi Uwano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 12 days.

(21) Appl. No.: 16/833,823

(22) Filed: Mar. 30, 2020

(65) Prior Publication Data

US 2020/0333170 A1 Oct. 22, 2020

(30) Foreign Application Priority Data

Apr. 22, 2019 (JP) .............................. JP2019-080948

(51) Int. Cl.
*G01D 18/00* (2006.01)
*G06F 17/18* (2006.01)
*G06F 16/215* (2019.01)

(52) U.S. Cl.
CPC ......... *G06F 16/215* (2019.01); *G01D 18/002* (2013.01); *G06F 17/18* (2013.01)

(58) Field of Classification Search
CPC ...... G06F 16/215; G06F 17/18; G01D 18/002
See application file for complete search history.

(56) References Cited

U.S. PATENT DOCUMENTS

| 11,010,365 B2* | 5/2021 | Lee | G06F 16/2365 |
| 2005/0032066 A1* | 2/2005 | Heng | G16H 50/50 |
| | | | 435/6.11 |
| 2020/0073915 A1* | 3/2020 | Takada | G06F 17/18 |

FOREIGN PATENT DOCUMENTS

| JP | 2012-251777 | 12/2012 |
| WO | 2014/199920 | 12/2014 |

OTHER PUBLICATIONS

Stef van Buuren, "Flexible Imputation of Missing Data, Second Edition", second chapter section 8, CRC Press 2018 (Year: 2018).*

(Continued)

*Primary Examiner* — Regis J Betsch
(74) *Attorney, Agent, or Firm* — Wenderoth, Lind & Ponack, L.L.P.

(57) ABSTRACT

A missing value imputation device for imputing a missing value in collected data includes: an imputation processing unit that measures a period of time required for imputation process by conducting a simulation, and associates the required period of time with each multiplexing number at which data is to be multiplexed through a multiple imputation technique; a multiplexing number acquisition unit, when an allowable period of time allowed for the imputation process is designated, the multiplexing number acquisition unit acquiring the multiplexing number at which the imputation process is to be finished within the allowable period of time, on the basis of the associated required period of time; and a calculation technique determination unit that determines a calculation technique for the imputation process in response to the acquired multiplexing number.

8 Claims, 3 Drawing Sheets

(56) References Cited

OTHER PUBLICATIONS

Huque et al., "A comparison of multiple imputation methods for missing data in longitudinal studies", BMC Medical Research Methodology (2018) 18:168 (Year: 2018).*

Garci'a-Laencina et al., "Pattern classification with missing data: a review", Neural Comput & Applic (2010) 19:263-282 (Year: 200).*

Masayoshi Takahashi and Takayuki Ito, "Comparison of Competing Algorithms of Multiple Imputation—Analysis Using Large-Scale Economic Data -," Research Memoir of the Statistics, vol. 71, pp. 39-82, Mar. 2014 with Abstract.

* cited by examiner

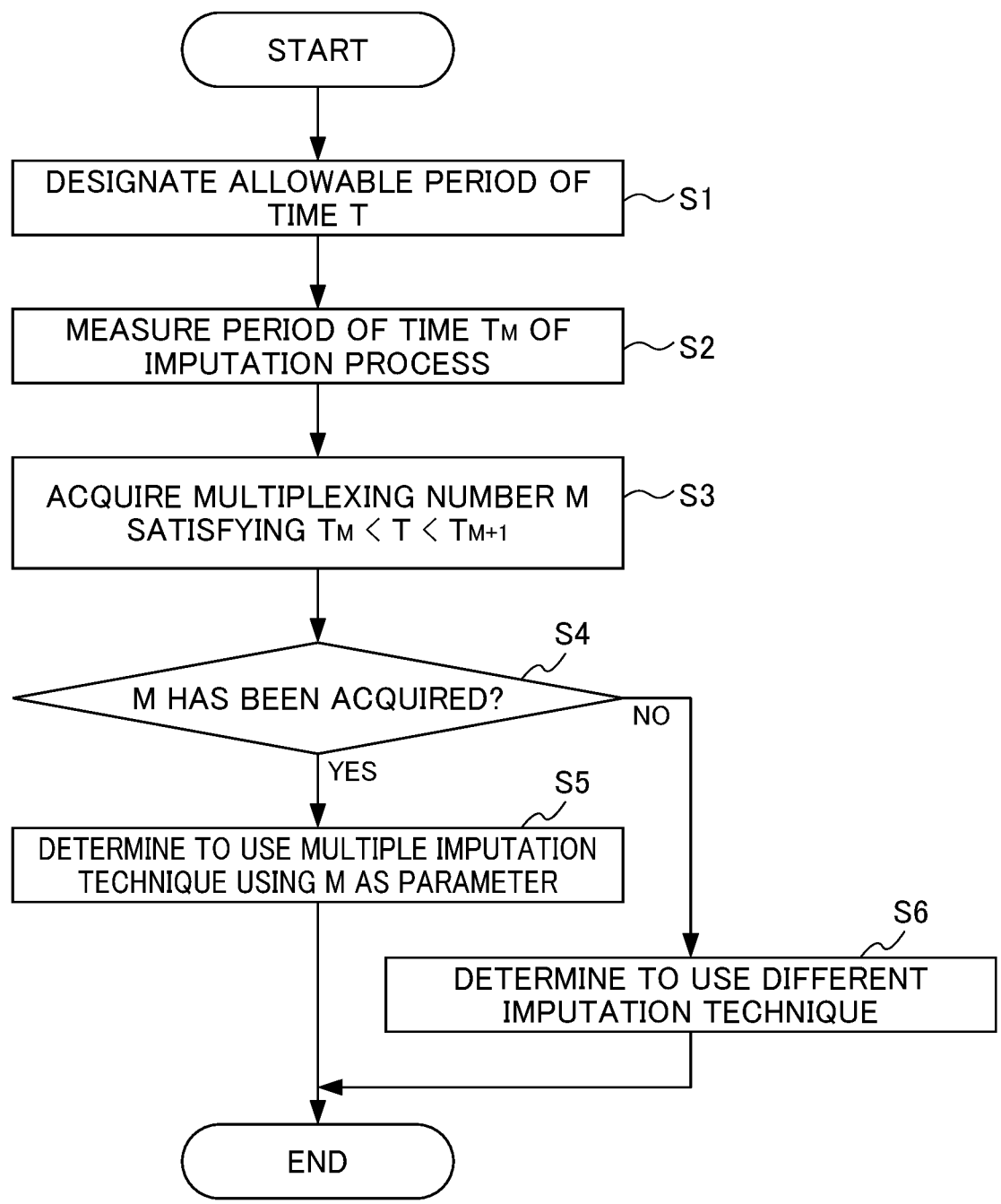

MISSING VALUE IMPUTATION DEVICE, MISSING VALUE IMPUTATION METHOD, AND MISSING VALUE IMPUTATION PROGRAM

This application is based on and claims the benefit of priority from Japanese Patent Application No. 2019-080948, filed on 22 Apr. 2019, the content of which is incorporated herein by reference.

BACKGROUND OF THE INVENTION

Field of the Invention

The present invention relates to a device, a method, and a program for imputing a missing value in collected data.

Related Art

According to a system, etc. conventionally operated, data such as a torque, vibration, a current resistance value, etc. is acquired in chronological order from an industrial machine such as a machine tool or a robot, for example, and a degree of abnormality is calculated. However, data missing may occur in a certain source of generation of such data, failing to acquire input to the system.

In this regard, various techniques for imputing data missing values have been suggested. In particular, a multiple imputation technique has widely been used as a technique accompanied by minor bias (see non-patent document 1, for example). For example, patent documents 1 and 2 suggest systems employing missing value imputation technology using the multiple imputation technique.

Patent Document 1: PCT International Publication No. WO2014/199920
Patent Document 2: Japanese Unexamined Patent Application, Publication No. 2012-251777
Non-Patent Document 1: Masayoshi TAKAHASHI and Takayuki ITO, "Comparison of Competing Algorithms of Multiple imputation technique," Research memoir of the statistics, volume 71, March 2014

SUMMARY OF THE INVENTION

However, the multiple imputation technique involves a large amount of calculation and takes time under a certain condition. Hence, in response to a need to use collected data in real time, it becomes difficult to impute a missing value within a fixed period of time (within few seconds, for example).

A missing value imputation device according to one aspect of this disclosure is to impute a missing value in collected data. The missing value imputation device includes: a measurement unit that measures a period of time required for imputation process by conducting a simulation, and associates the required period of time with each multiplexing number at which data is to be multiplexed through a multiple imputation technique; an acquisition unit, when an allowable period of time allowed for the imputation process is designated, the acquisition unit acquiring the multiplexing number at which the imputation process is to be finished within the allowable period of time, on the basis of the associated required period of time; and a determination unit that determines a calculation technique for the imputation process in response to the acquired multiplexing number.

A missing value imputation method according to one aspect of this disclosure is to impute a missing value in collected data. The missing value imputation method causes a computer to execute: a measurement step of measuring a period of time required for imputation process by conducting a simulation, and associating the required period of time with each multiplexing number at which data is to be multiplexed through a multiple imputation technique; an acquisition step, when an allowable period of time allowed for the imputation process is designated, the acquisition step acquiring the multiplexing number at which the imputation process is to be finished within the allowable period of time, on the basis of the associated required period of time; and a determination step of determining a calculation technique for the imputation process in response to the acquired multiplexing number.

A missing value imputation program according to one aspect of this disclosure is to cause a computer to function as the missing value imputation device.

According to one aspect, a missing value can be imputed within a designated period of time with reduced bias.

BRIEF DESCRIPTION OF THE DRAWINGS

FIG. 4 is a flowchart showing a method for determining a calculation technique used in imputation process by the missing value imputation device according to the one embodiment.

DETAILED DESCRIPTION OF THE INVENTION

An example of an embodiment of the present invention will be described next. A missing value imputation device 1 according to the embodiment is to impute a missing value in acquired data and output the data using operation management software for an industrial machine, for example. The missing value imputation device 1 mainly employs a multiple imputation technique as a technique for imputing a missing value, and adjusts a multiplexing number as a parameter described later in response to a situation of use of acquired data.

Figure 1:
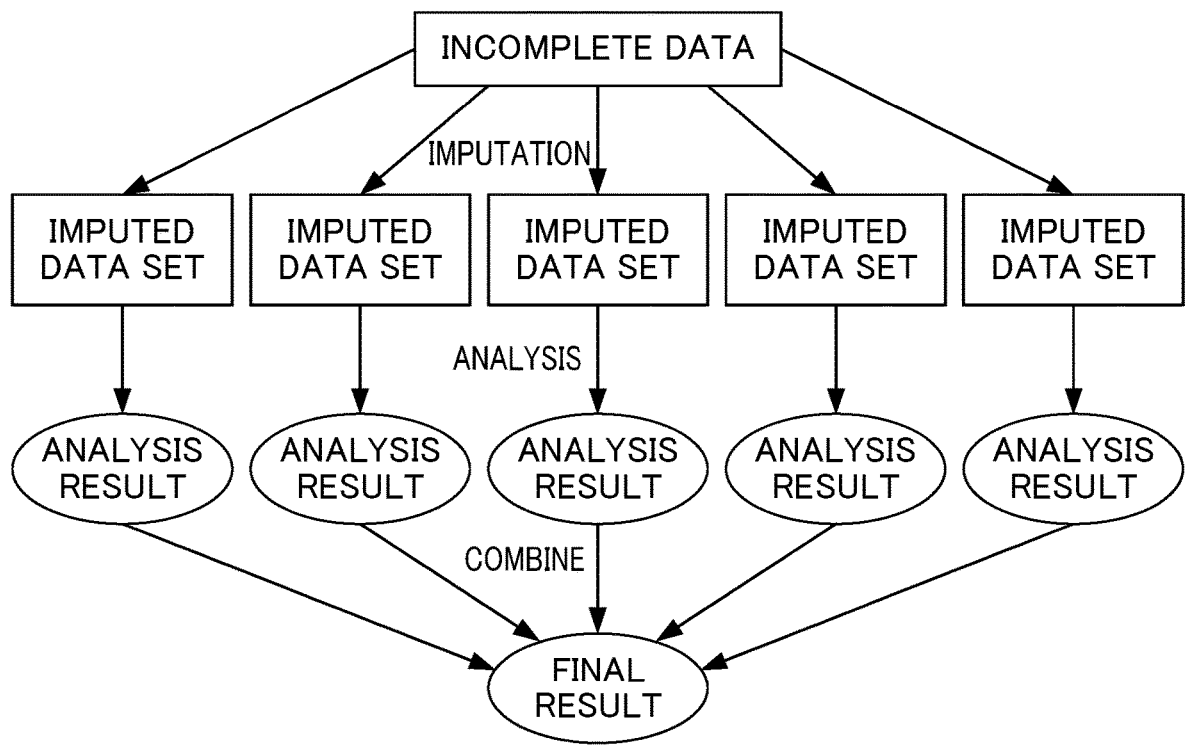
FIG. 1 explains a multiple imputation technique in outline according to one embodiment.

FIG. 1 explains the multiple imputation technique in outline according to the embodiment. According to the multiple imputation technique, M (for example, five) simulation values are extracted from a posterior distribution of missing values on condition that these missing values are in observed data of incomplete data, and imputed data sets are generated. These M data sets are subjected to statistical analysis separately, results are combined, and an estimated value as a final result is calculated.

In this case, as a multiplexing number M becomes larger, a resultant estimated value is given a higher degree of accuracy with less bias. This increases the amount of calculation, however, failing to finish imputation process within a period of time before use of data is started for purpose such as drawing of a graph. In this regard, the missing value imputation device 1 determines the multiplexing number M at which calculation is to be finished within such a designated period of time and at which bias is reduced to the lowest possible degree.

Figure 2:
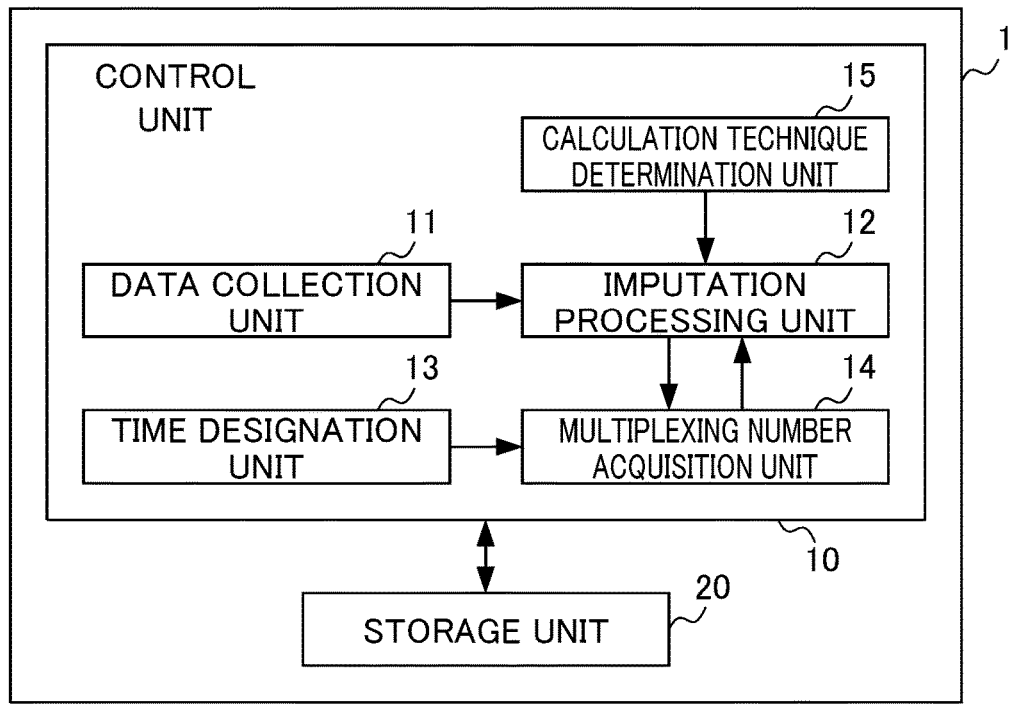
FIG. 2 shows the functional configuration of a missing value imputation device according to the one embodiment.

FIG. 2 shows the functional configuration of the missing value imputation device 1 according to the embodiment. The missing value imputation device 1 is an information processor (computer) such as a server device or a personal computer, and includes a control unit 10 and a storage unit 20. The missing value imputation device 1 may further include various types of input/output devices and communication devices.

The control unit 10 is responsible for control of the entire missing value imputation device 1, and realizes various functions of the embodiment by reading and executing software (missing value imputation program) stored in the storage unit 20. The control unit 10 may be a CPU. The control unit 10 includes a data collection unit 11, an imputation processing unit 12 (measurement unit), a time designation unit 13 (designation unit), a multiplexing number acquisition unit 14 (acquisition unit), and a calculation technique determination unit 15 (determination unit).

The storage unit 20 is a storage area for storing various types of programs, various types of data, etc. for causing a hardware group to function as the missing value imputation device 1. The storage unit 20 may be a ROM, a RAM, a flash memory, or a hard disk drive (HDD), for example.

The data collection unit 11 accepts data generated by the missing value imputation device 1 itself or time-series data such as a torque, vibration, a current resistance value, for example, acquired from an external machine.

The imputation processing unit 12 measures a period of time required for the imputation process by conducting a simulation under a situation where the imputation process is actually performed, while data collection is executed, for example. More specifically, the imputation processing unit 12 conducts a simulation for each multiplexing number M at which a data set is to be multiplexed through the multiple imputation technique, and stores each required period of time into the storage unit 20 in association with the multiplexing number M. Further, if missing actually occurs in data collected by the data collection unit 11, the imputation processing unit 12 performs the process of imputing a missing value by employing a calculation technique determined by the calculation technique determination unit 15.

The time designation unit 13 acquires a period of time from time of data collection until use start time when use of data is started, and designates the acquired period of time as an allowable period of time allowed for the imputation process. The use start time is time when drawing of a graph of collected data is started, for example. This use start time may alternatively be finish time of the drawing or start time estimated from the finish time, for example.

When the allowable period of time allowed for the imputation process is designated, the multiplexing number acquisition unit 14 acquires the multiplexing number M at which the imputation process is to be finished within the allowable period of time, on the basis of the association between the multiplexing number M and the required period of time stored in the storage unit 20. More specifically, the multiplexing number acquisition unit 14 determines a maximum value of the multiplexing number M at which the imputation process is to be finished within the allowable period of time.

The calculation technique determination unit 15 determines a calculation technique for the imputation process in response to the multiplexing number M acquired by the multiplexing number acquisition unit 14. More specifically, the calculation technique determination unit 15 determines the multiple imputation technique using the acquired multiplexing number M as a parameter to be a calculation technique, for example.

In this case, the calculation technique determination unit 15 may determine the multiple imputation technique to be a calculation technique using a parameter that is a smaller one of a minimum value of the multiplexing number M at which an index to efficiency based on a missing rate and the multiplexing number M exceeds a predetermined value and the maximum value acquired by the multiplexing number acquisition unit 14. According to non-patent document 1 described above, for example, asymptotic relative efficiency (ARE) of the multiple imputation technique is defined as follows:

$$ARE=(1+\delta/M)^{-1/2} \times 100$$

The calculation technique determination unit 15 calculates a data missing rate $\delta$ (%) from a data set to be used to obtain a relationship between M and ARE. Then, the calculation technique determination unit 15 may compare a minimum value of M at which ARE exceeds a predetermined value (95%, for example) with the maximum value acquired by the multiplexing number acquisition unit 14, and determine a smaller one to be a parameter for the multiple imputation technique.

Further, if continuity occurs in which estimated values of the imputation process agree with each other a predetermined number of times within a range of a designated number of significant figures in response to increase in the multiplexing number M in conducting a simulation of the imputation process, the calculation technique determination unit 15 may compare the multiplexing number M at which the continuity is started with the maximum value acquired by the multiplexing number acquisition unit 14, and determine a smaller one of this multiplexing number M to be a parameter for the multiple imputation technique.

Figure 3:
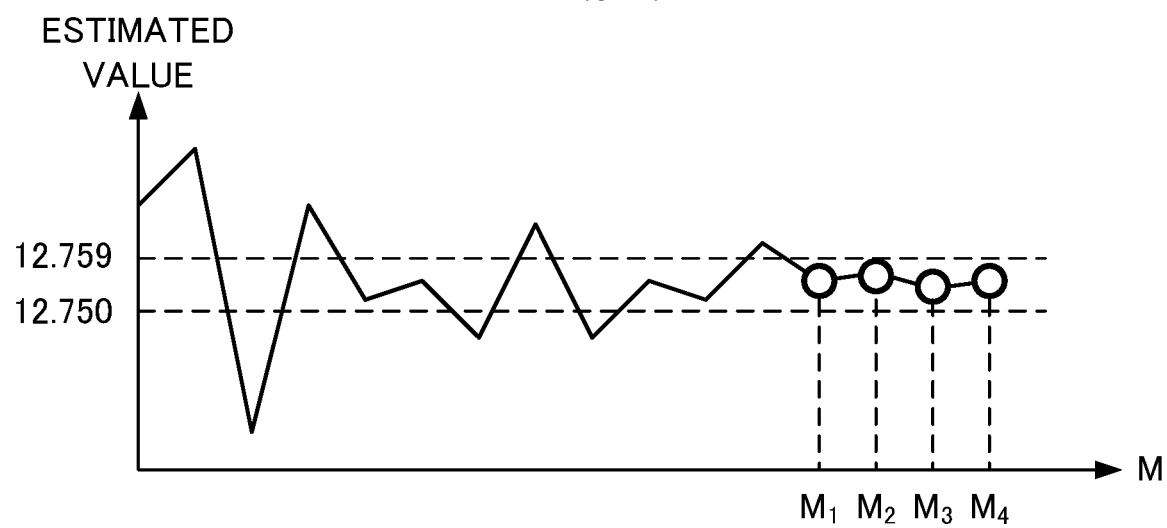
FIG. 3 shows an exemplary estimation result about a missing value obtained by changing a multiplexing number according to the one embodiment.

FIG. 3 shows an exemplary estimation result about a missing value obtained by changing the multiplexing number M according to the embodiment. If estimated values for imputing a missing value are calculated while the multiplexing number M is increased, the estimated values converge into a predetermined value. Thus, if the number of significant figures of target data is given, the estimated values agree with each other within a range of this given number of significant figures with the multiplexing number M equal to or greater than a certain number.

If significant figures continue to the second decimal place, and if estimated values converge continuously (four times, for example) into a predetermined range such as from 12.750 to 12.759, for example, the multiple imputation technique may be performed using $M_1$ shown in FIG. 3 as an upper limit of the multiplexing number M. For a higher degree of safety, $M_2$ or $M_3$ may be selected as an upper limit, for example.

If the multiplexing number acquisition unit 14 fails to acquire a maximum value of the multiplexing number M for reason such as the absence of the multiplexing number M at which the imputation process can be finished within an allowable period of time, the calculation technique determination unit 15 determines a predetermined imputation technique to be a calculation technique instead of the multiple imputation technique. The predetermined imputation technique is not limited. Imputation using a constant, imputation using an aggregated value (such as an average or a median), imputation using a predicted value based on data without missing, imputation using a chronological relationship, or a maximum likelihood method is applicable, for example.

FIG. 4 is a flowchart showing a method for determining a calculation technique used in the imputation process by the missing value imputation device 1 according to the embodiment.

In step S1, the time designation unit 13 designates an allowable period of time T from collection of data until completion of imputation of a missing value on the basis of input from a user. Alternatively, the time designation unit 13 designates the allowable period of time T automatically in response to a situation of use of data.

In step S2, the imputation processing unit 12 performs the imputation process through the multiple imputation technique on each of the multiplexing numbers M=1, 2, 3, . . . in the same situation as imputation of a missing value actually occurred. In this way, the imputation processing unit 12 conducts a simulation to measure a period of time $T_M$ until finish of the imputation process.

In step S3, the multiplexing number acquisition unit 14 acquires the multiplexing number M satisfying $T_M<T<T_{M+1}$.

In step S4, the calculation technique determination unit 15 judges whether the multiplexing number M has been acquired in step S3. If a result of the judgement is YES, the flow goes to step S5. If a result of this judgement is NO, the flow goes to step S6.

In step S5, the calculation technique determination unit 15 determines the multiple imputation technique using the multiplexing number M as a parameter to be a calculation technique for the imputation process.

In step S6, the calculation technique determination unit 15 determines a different imputation technique instead of the multiple imputation technique to be a calculation technique for the imputation process.

As a result of the foregoing flow of the steps, the missing value imputation device 1 determines the multiple imputation technique using the multiplexing number M as a parameter or a different imputation technique to be a calculation technique for the imputation process appropriately. Then, on the occurrence of missing in data actually collected, the imputation processing unit 12 of the missing value imputation device 1 performs the imputation process on a missing value through the determined calculation technique.

The order of executing the processing steps is not limited to the one described above. As an example, steps S1 and S2 may be switched, and the imputation processing unit 12 may store data in advance containing the multiplexing number M and the processing period of time $T_M$ in association with each other. By doing so, an appropriate multiplexing number M may be selected in response to designation of the allowable period of time T. This allows the multiplexing number acquisition unit 14 to acquire the multiplexing number M immediately in response to change in the allowable period of time T occurring during data collection. The calculation technique determined in steps S5 and S6 may be registered in advance with a database, for example, in association with each multiplexing number M.

The embodiment acts in the following ways and achieves the following effects, for example.

(1) The missing value imputation device 1 for imputing a missing value in collected data includes: the measurement unit (imputation processing unit 12) that measures a period of time required for the imputation process by conducting a simulation, and associates the required period of time with each multiplexing number at which data is to be multiplexed through the multiple imputation technique; the acquisition unit (multiplexing number acquisition unit 14), when an allowable period of time allowed for the imputation process is designated, the acquisition unit acquiring the multiplexing number at which the imputation process is to be finished within the allowable period of time, on the basis of the associated required period of time; and the determination unit (calculation technique determination unit 15) that determines a calculation technique for the imputation process in response to the acquired multiplexing number. In this way, the missing value imputation device 1 acquires the multiplexing number at which the imputation process is to be finished within the allowable period of time. This allows imputation of a missing value through the multiple imputation technique while reducing bias within the designated allowable period of time.

(2) The missing value imputation device 1 described in (1) may include the designation unit (time designation unit 13) that acquires a period of time from time of collection of the data until use start time when use of the data is started, and designates the acquired period of time as the allowable period of time. This allows the missing value imputation device 1 to acquire the allowable period of time automatically, making it possible to determine an appropriate calculation technique efficiently for the imputation.

(3) In the missing value imputation device 1 described in (1) or (2), the acquisition unit (multiplexing number acquisition unit 14) may acquire a maximum value of the multiplexing number at which the imputation process is to be finished within the allowable period of time. This causes the missing value imputation device 1 to maximize the multiplexing number on condition that the imputation process is to be finished within the allowable period of time. Thus, bias can be reduced to the lowest possible degree and a missing value can be estimated with a higher degree of accuracy.

(4) In the missing value imputation device 1 described in (3), the determination unit (calculation technique determination unit 15) may determine the multiple imputation technique to be the calculation technique using a parameter that is a smaller one of a minimum value of the multiplexing number at which an index to efficiency based on a missing rate and the multiplexing number exceeds a predetermined value and the maximum value acquired by the acquisition unit (multiplexing number acquisition unit 14). In this way, the missing value imputation device 1 uses the multiplexing number as an upper limit allowing acquisition of a sufficient degree of estimation accuracy on the basis of the index to efficiency (ARE), thereby achieving reduction in processing load and reduction in a period of time for calculation.

(5) In the missing value imputation device 1 described in (3), if continuity occurs in which estimated values of the imputation process agree with each other a predetermined number of times within a range of a designated number of significant figures in response to increase in the multiplexing number in conducting the simulation, the determination unit (calculation technique determination unit 15) may determine the multiple imputation technique to be the calculation technique using a parameter that is a smaller one of the multiplexing number at which the continuity is started and the maximum value acquired by the acquisition unit (multiplexing number acquisition unit 14). In this way, the missing value imputation device 1 uses the multiplexing number as an upper limit allowing acquisition of a sufficient degree of estimation accuracy in response to the required number of significant figures of data, thereby achieving reduction in processing load and reduction in a period of time for calculation.

(6) In the missing value imputation device 1 described in any one of (1) to (5), if the acquisition unit (multiplexing number acquisition unit 14) fails to acquire the multiplexing number, the determination unit (calculation technique determination unit 15) may determine a predetermined imputation technique to be the calculation technique instead of the multiple imputation technique. By doing so, if the imputation process is not to be finished within the allowable period of time through the use of the multiple imputation technique, the missing value imputation device 1 employs a different calculation technique to reduce the probability of failing to impute a missing value.

While the embodiment of the present invention has been described above, the present invention should not be limited to the foregoing embodiment. The effects described in the embodiment are merely a list of the most preferable effects resulting from the present invention. Effects achieved by the present invention should not be limited to those described in the embodiment.

A particular algorithm of the multiple imputation technique is not limited. For example, a prediction technique to be employed may be predictive mean matching, etc., and an analysis technique to be employed may be linear regression, etc. Further, different prediction techniques and different analysis techniques may be employed in response to multiplexing numbers.

A missing value imputation method implemented by the missing value imputation device 1 is realized by software. To realize the missing value imputation method by software, programs configuring the software are installed on a computer. These programs may be stored in a removable medium and then distributed to a user. Alternatively, these programs may be distributed by being downloaded to a computer of the user through a network.

EXPLANATION OF REFERENCE NUMERALS

1 Missing value imputation device
10 Control unit
11 Data collection unit
12 Imputation processing unit (measurement unit)
13 Time designation unit (designation unit)
14 Multiplexing number acquisition unit (acquisition unit)
15 Calculation technique determination unit (determination unit)
20 Storage unit

What is claimed is:

1. A missing value imputation device for imputing a missing value in collected data comprising:
    a measurement unit that measures a period of time required for imputation process by conducting a simulation, and associates the required period of time with each multiplexing number at which data is to be multiplexed through a multiple imputation technique;
    an acquisition unit, when an allowable period of time allowed for the imputation process is designated, the acquisition unit acquiring the multiplexing number at which the imputation process is to be finished within the allowable period of time, on the basis of the associated required period of time; and
    a determination unit that determines a calculation technique for the imputation process in response to the acquired multiplexing number.

2. The missing value imputation device according to claim 1, comprising
    a designation unit that acquires a period of time from time of collection of the data until use start time when use of the data is started, and designates the acquired period of time as the allowable period of time.

3. The missing value imputation device according to claim 1, wherein
    the acquisition unit acquires a maximum value of the multiplexing number at which the imputation process is to be finished within the allowable period of time.

4. The missing value imputation device according to claim 3, wherein
    the determination unit determines the multiple imputation technique to be the calculation technique using a parameter that is a smaller one of a minimum value of the multiplexing number at which an index to efficiency based on a missing rate and the multiplexing number exceeds a predetermined value and the maximum value acquired by the acquisition unit.

5. The missing value imputation device according to claim 3, wherein
    if continuity occurs in which estimated values of the imputation process agree with each other a predetermined number of times within a range of a designated number of significant figures in response to increase in the multiplexing number in conducting the simulation, the determination unit determines the multiple imputation technique to be the calculation technique using a parameter that is a smaller one of the multiplexing number at which the continuity is started and the maximum value acquired by the acquisition unit.

6. The missing value imputation device according to claim 1, wherein
    if the acquisition unit fails to acquire the multiplexing number, the determination unit determines a predetermined imputation technique to be the calculation technique instead of the multiple imputation technique.

7. A non-transitory computer-readable medium storing a missing value imputation program for causing a computer to function as the missing value imputation device according to claim 1.

8. A missing value imputation method for imputing a missing value in collected data, the method causing a computer to execute:
    a measurement step of measuring a period of time required for imputation process by conducting a simulation, and associating the required period of time with each multiplexing number at which data is to be multiplexed through a multiple imputation technique;
    an acquisition step, when an allowable period of time allowed for the imputation process is designated, the acquisition step acquiring the multiplexing number at which the imputation process is to be finished within the allowable period of time, on the basis of the associated required period of time; and
    a determination step of determining a calculation technique for the imputation process in response to the acquired multiplexing number.

* * * * *